United States Patent
Schröder

[11] Patent Number: 5,659,294
[45] Date of Patent: Aug. 19, 1997

[54] RAIN SENSOR

[75] Inventor: Hans-Joachim Schröder, Wiesbaden, Germany

[73] Assignee: VDO Adolf Schindling AG, Frankfurt, Germany

[21] Appl. No.: 382,927

[22] Filed: Feb. 2, 1995

[30] Foreign Application Priority Data

May 17, 1994 [DE] Germany ............... 44 17 074.2
Jul. 1, 1994 [DE] Germany ............... 44 23 092.3

[51] Int. Cl.$^6$ .................................................. G08B 21/00
[52] U.S. Cl. ........................... 340/602; 73/73; 200/61.05
[58] Field of Search ........................... 340/602; 73/73; 318/483; 200/61.05

[56] References Cited

U.S. PATENT DOCUMENTS 3,794,847  2/1974  Cadiou ......................... 200/61.05
4,048,469  9/1977  Ciarniello et al. ............... 340/602
4,196,338  4/1980  Edel .................................. 73/73
4,527,106  7/1985  Fischer ......................... 200/61.05
4,541,904  9/1985  Lüder et al. ..................... 205/106
4,665,351  5/1987  Nyberg .......................... 318/483
4,827,198  5/1989  Mueller et al. .................. 318/483
5,040,411  8/1991  Medzius ........................... 73/73
5,304,936  4/1994  Buschur ......................... 318/483
5,321,345  6/1994  Lambros et al. ................ 340/602

Primary Examiner—Jeffery Hofsass
Assistant Examiner—John Tweel, Jr.
Attorney, Agent, or Firm—Martin A. Farber

[57] ABSTRACT

A rain sensor having two non-contacting conductive paths which are aligned parallel to each other and are arranged on the windshield of a motor vehicle, with an evaluation electronics system connected to them. In order to create a rain sensor having the smallest possible dimensions, the width of at least one conductive path is made non-constant over its length.

10 Claims, 3 Drawing Sheets

RAIN SENSOR

FIELD AND BACKGROUND OF THE INVENTION

The present invention relates to a rain sensor having two spaced conductive paths lying parallel to each other and arranged on the windshield of a motor vehicle, there being an evaluation electronics system connected to the two conductive paths.

It is known to arrange rain sensors on the windshield of a car in the region of the windshield wiper. As a function of the amount of wetness present on the windshield, these rain sensors provide to an evaluation circuit within the motor vehicle a signal which is used ordinarily to control the windshield wiper.

Sensors which are located on the outside of the windshield consist of two conductive paths, not in contact with each other, which have conductive-path sections which are parallel to each other and which engage in comb-like manner in each other but are not electrically connected to each other. They are developed as structures of constant width. The conductive paths are provided with electric connecting devices. During a rain storm the electrically conductive paths are bridged by drops of water with resulting electric characteristics describable by an electric measuring graph.

A short-circuiting of the conductive paths by the drops of water effects a change in the total resistance of the sensor. As a function of the degree of wetness on the windshield at the time, a reproducible electric signal can thus be produced via the change in resistance.

In order to obtain a specific resistance, the conductive paths of the rain sensor must have a given length. This gives the result that the rain sensor takes up a certain amount of space on the windshield.

In particular, with the rain sensor arranged on the windshield, a sensor of large size interferes with the field of view of the driver. In order to reduce this disadvantage the rain sensor is generally so arranged that it is covered by the rear-view mirror present within the vehicle.

SUMMARY OF THE INVENTION

The object of the invention is therefore to provide a rain sensor having the smallest possible dimensions.

According to the invention, this object is achieved in the manner that the width of at least one conductive path (e.g. 1, 2) is not constant over its length. The width of the conductive path preferably increases or decreases over a portion of the path, or has both portions which are increasing in width and portions which are decreasing in width.

The advantage of the invention resides in the fact that the effective resistance is increased because the effective path length of the conductive path is lengthened. This gives the result that a given resistance takes up substantially less space than a conductive path of constant width, i.e. one having a smooth edge.

In one embodiment, the width of the conductive path is changed in one or more defined regions.

According to another embodiment of the invention, the width of the conductive path changes over its entire length.

In this way, the light transmission of the sensor is increased and new possibilities exist for the arrangement of the rain sensor on the windshield in the region of the windshield wipers.

This can be effected in particularly favorable manner if the conductive path is produced by means of a sputter etching process.

According to another feature of the invention, at least one edge of the conductive path (1, 2) is developed with a corrugated or meandering shape.

Still further, the invention provides that the conductive path (1, 2) is applied by sputter etching to the windshield.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
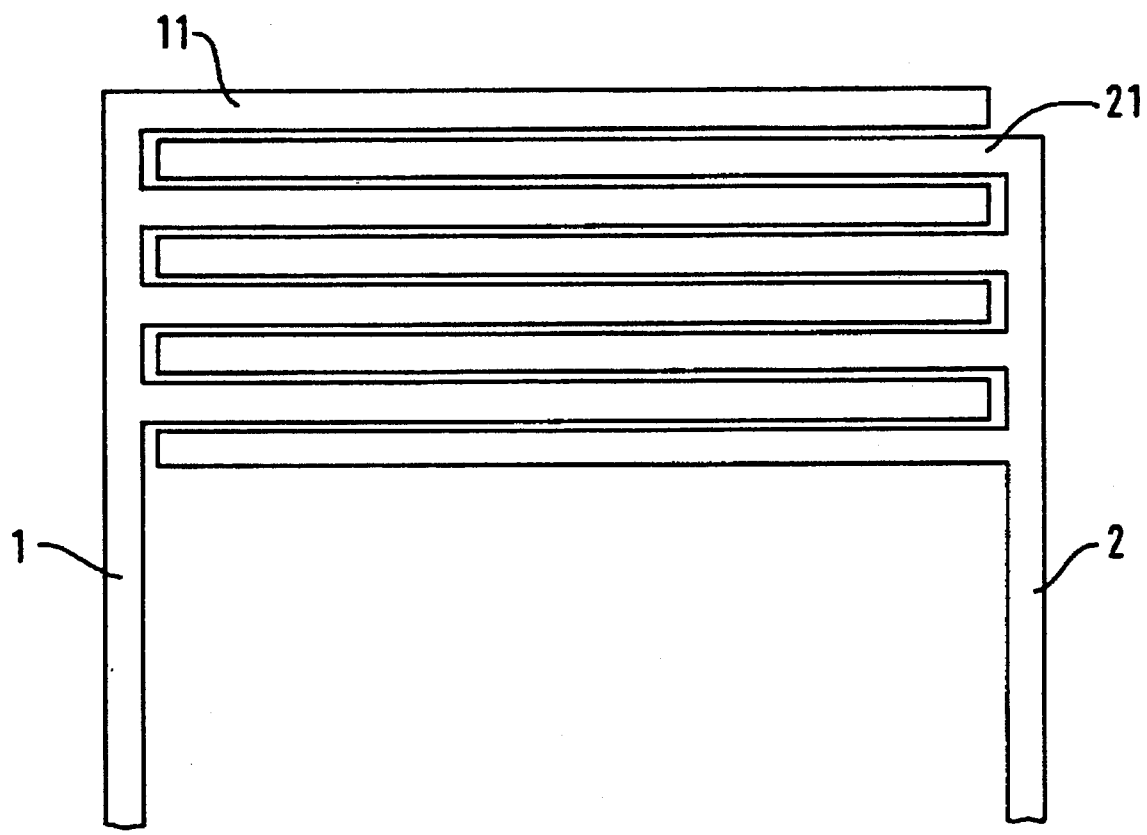
FIG. 1 is a plan view of a sensor structure of the prior art.

The customary structure of a resistive rain sensor is shown in FIG. 1.

Two conductive paths 1,2 of comb-like development are arranged meshed in each other in such a manner on the outside of the windshield that, when the windshield is dry, sufficient electric insulation between the conductive paths is assured. Each of the conductive paths 1 and 2 is connected to an electric potential, not shown.

Each of the conductive paths 1 and 2 consists of a layer of chromium of a thickness of a few atomic layers.

The individual conductive-path sections 11, 21 are aligned parallel to each other in their lengthwise direction. The width of each of the conductive-path sections 11, 21 is constant over its entire length.

Figure 2:
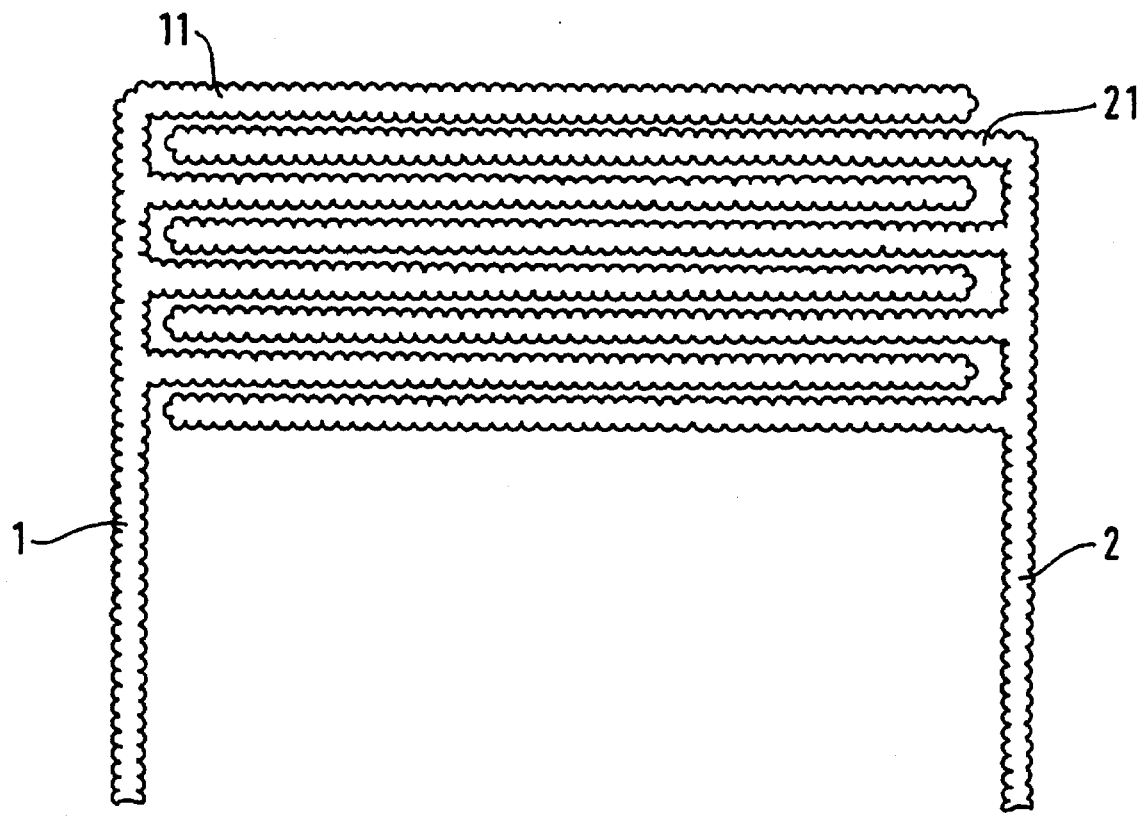
FIG. 2 is a plan view of a first embodiment of the sensor structure of the invention.

The sensor structure of the invention which is shown diagrammatically in FIG. 2 also has conductive paths 1 and 2 which are developed in comb shape, wherein the individual conductive-path sections 11, 21 thereof mesh in each other and are arranged parallel to each other in their lengthwise direction.

The conductive paths 1 and 2 are developed with an undulated shape over their entire length so that the width of each conductive path in these sections changes continuously. By this undulated development of the edges of the conductive path, the effective length and effective cross section of the conductive path are changed, which results in a change in the total resistance of the sensor.

The conductive paths 1, 2 are lengthened geometrically in accordance with the outer contour selected. In the event that they are developed as semicircles arranged alongside each other, a lengthening of the conductive path by a factor of $\pi/2$ is obtained.

Customary resistance structures have an area of 70–80 $cm^2$, the effective length of the conductive paths being approximately 6 meters. With the same area, the effective length of the resistance structure of the invention is about 10 meters.

There is also the possibility of developing only the circuit-path sections 11, 21 in accordance with the invention.

The sensor structure of the invention can be produced in simple manner on the windshield by sputter etching.

Figure 3:
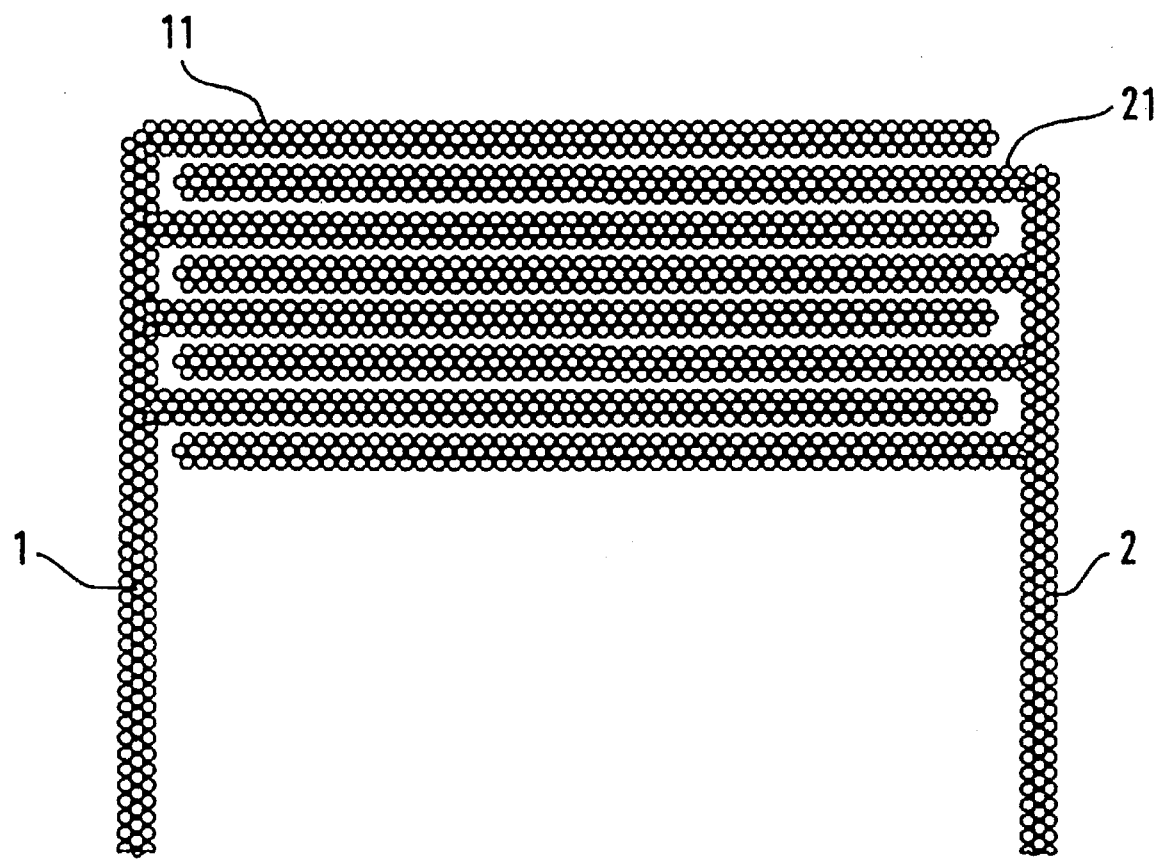
FIG. 3 is a plan view of a second embodiment of the sensor structure of the invention.

FIG. 3 shows a sensor structure produced by sputter etching. The raster points forming the conductive paths 1, 2 are in this case transparent.

By variation of the transparent (and non-transparent) raster points, given patterns (for instance a company logo) can also be produced by means of the conductive path.

I claim:

1. A rain sensor comprising:

two spaced-apart conductive paths lying parallel to each other, wherein, upon installation of the rain sensor upon a windshield of a motor vehicle, the conductive paths are disposed on the windshield and are connected electrically to evaluation electronics system of the vehicle; and wherein opposed edges of each of said conductive paths undergo a succession of multiple arcuate undulations producing a succession of multiple increases and decreases in a width of each of said conductive paths for increasing an effective resistive length of the sensor.

2. A rain sensor according to claim 1, wherein the increase of the effective resistive length is by a factor of 5/3.

3. A rain sensor comprising:

two spaced-apart conductive paths lying parallel to each other, wherein, upon installation of the rain sensor upon a windshield of a motor vehicle, the conductive paths are disposed on the windshield and are connected electrically to an evaluation electronics system of the vehicle;

wherein at least one edge of one of said conductive paths has wavy shape providing for a variation in the width of said at least one of said conductive paths over its length; and in at least one of said conductive paths, a section of the path undergoes a succession of multiple increases and decreases in width for an increase of effective resistive length by a factor of approximately 5/3.

4. A rain sensor according to claim 1, wherein the width of one of said conductive paths varies along the entire length of the path with a succession of multiple undulations to increase the effective resistive length of the sensor.

5. A rain sensor according to claim 1, wherein at least one edge of at least one of said conductive paths has a corrugated shape.

6. A rain sensor comprising:

two spaced-apart conductive paths lying parallel to each other, wherein, upon installation of the rain sensor upon a windshield of a motor vehicle, the conductive paths are disposed on the windshield and are connected electrically to an evaluation electronics system of the vehicle;

wherein at least one edge of one of said conductive paths has a wavy shape providing for a variation in the width of said at least one of said conductive paths over its length; and at least one edge of at least one of said conductive paths has an arcuate shape with a succession of multiple undulations.

7. A rain sensor according to claim 3, wherein at least one of said conductive paths has the form of a path applied to a windshield by a sputter etching process.

8. A rain sensor comprising:

a first conductor and a second conductor spaced apart by distance from each other and arranged for installation upon a windshield of a motor vehicle;

a first conductive path extending most of the distance from said first conductor toward said second conductor, but being spaced apart from said second conductor;

a second conductive path extending most of the distance from said second conductor toward said first conductor but being spaced apart from said first conductor, said second conductive path being spaced apart from and being parallel to said first conductive path;

wherein an edge of one of said conductive paths is configured with a sequence of multiple arcuate segments producing a sequence of multiple increases and multiple decreases in the width of said one conductive path for an increased effective resistance length of the sensor.

9. A method of constructing a rain sensor comprising:

sputter etching onto a windshield a first conductor and a second conductor spaced apart by a distance from each other upon the windshield;

sputter etching onto the windshield a first conductive path extending most of the distance from said first conductor toward said second conductor, but being spaced apart from said second conductor;

sputter etching onto the windshield a second conductive path extending most of the distance from said second conductor toward said first conductor, but being spaced apart from said first conductor, said second conductive path being space apart from and being parallel to said first conductive path;

wherein said sputter etching produces an edge on one of said conductive paths configured with a sequence of multiple arcuate segments resulting in a succession of multiple increases and multiple decreases of said one conductive path.

10. A method of constructing a rain sensor comprising:

sputter etching onto a windshield a first conductor and a second conductor spaced apart by a distance from each other upon the windshield;

sputter etching onto the windshield a first conductive path extending most of the distance from said first conductor toward said second conductor, but being spaced apart from said second conductor;

sputter etching onto the windshield a second conductive path extending most of the distance from said second conductor toward said first conductor, but being spaced apart from said first conductor, said second conductive path being space apart from and being parallel to said first conductive path;

wherein said sputter etching produces an edge on one of said conductive paths configured with a sequence of arcuate segments; and said sputter etching produces a sequence of transparent raster points in said conductors.

* * * * *